April 3, 1962 V. S. MORRIS 3,027,715
RADIALLY FREE SUPPORT FOR COMBUSTION CHAMBER FUEL MANIFOLD
Filed Oct. 22, 1956

INVENTOR
V. S. MORRIS
BY: Maybee & Legris
ATTORNEYS

United States Patent Office 3,027,715
Patented Apr. 3, 1962

3,027,715
RADIALLY FREE SUPPORT FOR COMBUSTION CHAMBER FUEL MANIFOLD
Victor Sidney Morris, Toronto, Ontario, Canada, assignor, by mesne assignments, to Her Majesty the Queen in the right of Canada as represented by the Minister of National Defence, Ottawa, Ontario, Canada
Filed Oct. 22, 1956, Ser. No. 617,656
3 Claims. (Cl. 60—39.32)

This invention relates to a support for bodies subject to differential expansion and in particular to means for mounting a completely circular fuel manifold onto the circular wall of an adjacent combustion chamber, where a variable temperature difference exists between the manifold and the wall.

The object of the invention is to permit substantially unrestrained movement, due to differential thermal expansion, between the manifold and the wall in a radial direction, whilst the manifold is fully restricted in all other directions, thus allowing free expansion of each component, but maintaining the manifold concentric to the combustion chamber.

This object is obtained by means of supporting brackets having parts relatively movable in the direction of the prospective expansion of the parts, but restrained from movement in other directions.

The invention is hereinafter more particularly described and is illustrated in the accompanying drawings in which.

Corresponding reference numerals in the different FIGURES refer to corresponding parts.

Figure 1:
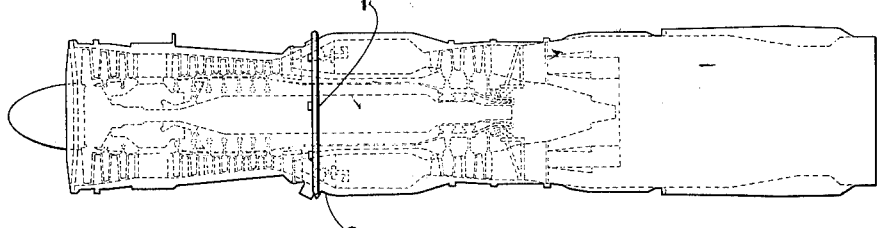
FIG. 1 is a diagrammatic side elevation of a gas turbine engine showing major components in dotted lines, and showing the location of the circular fuel manifold to which the preferred embodiment of this invention relates.
Figure 2:
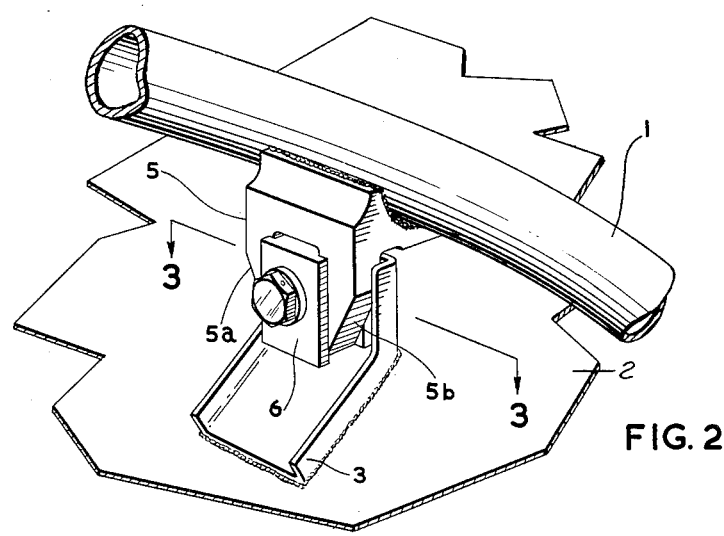
FIG. 2 is an isometric view showing the mounting of a manifold ring on a combustion chamber, said ring and the wall of the combustion chamber being broken away.
Figure 3:
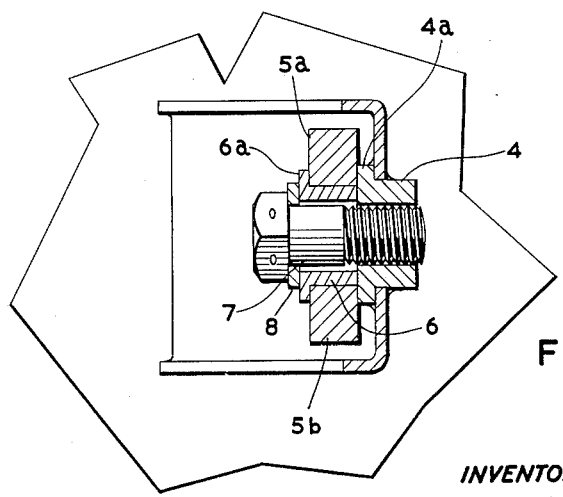
FIG. 3 is a section through the support on the line 3—3 in FIG. 2.

The manifold ring 1 is illustrated as being mounted on the circular wall 2 of the combustion chamber of a gas turbine engine. Secured by brazing or other means to the outer wall of the combustion chamber is a bracket 3 having secured to and forming part thereof a tapped boss 4. The bracket 3 is shown as being a flanged L-shaped bracket, one arm of the L being secured to the circular wall of the combustion chamber, and the other arm of the L, to which is secured the boss 4, projecting upwardly substantially normal to the axis of the combustion chamber.

Secured by brazing or other suitable means to the circular manifold 1 is another bracket 5 which has prongs 5a and 5b extending downwardly or inwardly substantially normal to the axis of the combustion chamber. The inside faces of these prongs are substantially parallel and fit closely into channels in the side of a T-block 6 and are adapted to slide relative to one another when relative movement of the manifold and the combustion chamber wall takes place owing to differences in the temperatures of the two parts.

T-block 6 has a hole passing through it and is secured to the bracket 3 by means of a bolt 7 which passes through the hole and is screwed into the tapped boss 4. Preferably the hole in the T-block 6 is of considerably greater diameter than the diameter of the bolt so that if there is any misalignment between the prongs on the bracket 5 and the tapped hole in the boss 4 of the bracket 3, there will be sufficient clearance to take it up. Preferably a washer 8 will be interposed between the head of the bolt 7 and the T-block 6. Functionally, the T-block 6 forms part of the bracket 3.

The T-block is substantially rectangular and is recessed to form one sided channels which form guides to receive the prongs 5a and 5b, with an exterior flange 6a. The thickness of the prongs 5a and 5b is substantially equal to the depth of the grooves or channels of the T-block 6, so that when the bolt 7 is tightened, the inner unflanged edge of the T-block will engage the outer edge 4a of the boss 4. The outer edge 4a of the boss 4 will form the inner edge of a channel of which the flange 6a is the outer edge.

In the preferred embodiment described the operation of the device is as follows:

A plurality of brackets 3 will be secured to the exterior of the combustion chamber 2, and corresponding brackets 5 will be secured to the manifold 1. T-block 5 will be fitted between prongs 5a and 5b and the manifold will be placed ever the combustion chamber with the hole in the T-block registering with the hole in the boss 4. The brackets will then be fastened together by means of the bolt 7.

While bracket 3 is shown as secured to the wall of a combustion chamber and bracket 5 is shown as being secured to the circular manifold, it is obvious that the positions could be reversed without departing from the invention.

What I claim as my invention is:

1. A support for a circular fuel manifold on the circular wall of the combustion chamber of a gas turbine engine, where a variable temperature exists between the manifold and the wall, comprising a plurality of brackets secured to the manifold around its periphery and a plurality of opposed brackets secured to the wall of the combustion chamber around its periphery, some of the brackets being provided with fixed guides having channels extending radially of the combustion chamber and each opposed bracket being provided with a two-pronged portion extending into the channels and slidable therein radially of the combustion chamber, and means for securing opposed brackets together against movement in directions other than radial of the combustion chamber.

2. The combination in a gas turbine engine of an annular fuel manifold, an outer circular wall of a combustion chamber surrounded by the fuel manifold, and a plurality of supports interposed between the wall and the manifold, each support including a first bracket secured to the wall, the bracket including an upstanding portion, a shouldered boss received in an aperture in the portion so that the shoulders of the boss lie adjacent to one surface of the portion, a a rectangular T-block having flanges and a shank, the T-block being secured to the boss by a fastener so that the unflanged end of the T-block lies adjacent to the shoulders of the boss, the shoulders of the boss, the shank and the flanges of the T-block forming a pair of parallel channels, a pluarilty of second brackets secured to the manifold, each of the second brackets corresponding to and being opposed to one of the first brackets, and a pair of prongs on each of the second brackets closely received within the channels in the corresponding first bracket so that relative movement between the brackets is permitted in directions parallel to the channels and is prevented in all other directions, the channels being directed generally radially of the combustion chamber.

3. The combination in a gas turbine engine of an annular fuel manifold, a circular wall of a combustion chamber surrounded by the fuel manifold and a plurality of supports interposed between the wall and the combustion chamber, each support including a first bracket secured to the wall of the combustion chamber, the bracket including an upstanding portion, a shouldered boss received in the aperture in the portion so that the shoulders of the boss lie adjacent to one surface of the portion, a rectangular T-block having flanges and a shank, the T-block being secured to the boss by a bolt which passes through an aperture in the block and is received in a threaded aperture in the boss, the unflanged end of the T-block lying adjacent to the shoulders of the boss so that the shoulders of the boss, the shank and the flanges of the T-block form a pair of channels, a plurality of second brackets secured to the manifold, each of the second brackets corresponding to and being opposed to one of the first brackets, and a pair of prongs on each of the second brackets closely received within the channels in the corresponding first bracket so that relative movement between the brackets is permitted in directions parallel to the channels and is prevented in all other directions, the channels lying generally radially of the combustion chamber.

References Cited in the file of this patent

UNITED STATES PATENTS

| | | |
|---|---|---|
| 755,847 | Clarkson | Mar. 29, 1904 |
| 963,000 | Deihl | June 28, 1910 |
| 2,113,083 | Height | Apr. 5, 1938 |
| 2,445,114 | Halford | July 13, 1948 |